United States Patent

[11] 3,556,156

[72] Inventor Forney Fuller, Jr.
P.O. Box 24151, New Orleans, La. 70124
[21] Appl. No. 663,884
[22] Filed Aug. 28, 1967
[45] Patented Jan. 19, 1971

[54] MAGNETICALLY ACTUATED VALVE
6 Claims, 8 Drawing Figs.
[52] U.S. Cl............................................... 138/43,
251/65, 251/141, 251/137
[51] Int. Cl................................................. F15d 1/10,
F16k 31/06
[50] Field of Search........................................... 251/129,
137, 65, Ball V. Supp, 138, 140, 141, 120, 127;
138/43, 46; 137/436, 444

[56] References Cited
UNITED STATES PATENTS

| | | | |
|---|---|---|---|
| 2,090,727 | 8/1937 | Gosmann.................. | 138/43 |
| 2,442,599 | 6/1948 | Herrick, Jr., et al.......... | 251/65X |
| 2,536,813 | 1/1951 | Jones et al................... | 251/65 |
| 2,576,168 | 11/1951 | Allen............................. | 251/65X |
| 2,601,549 | 6/1952 | Morton et al................. | 251/129X |
| 2,967,544 | 1/1961 | Pearsall........................ | 251/(Ball Sup.)UX |
| 3,212,751 | 10/1965 | Hassa........................... | 251/65 |
| 3,355,140 | 11/1967 | Andersen..................... | 251/65 |
| 1,903,902 | 4/1933 | McLaren...................... | 251/65X |
| 2,629,401 | 2/1953 | Miller............................ | 251/65X |
| 3,064,684 | 11/1962 | Hutton.......................... | 251/65X |

FOREIGN PATENTS

| | | | |
|---|---|---|---|
| 1,069,442 | 2/1954 | France.......................... | 251/65 |
| 1,369,258 | 6/1964 | France..........................| 251/Ball Sup.UX |
| 18,353 | 9/1897 | Great Britain................ | 251/137 |

Primary Examiner—Arnold Rosenthal
Attorney—M. Ted Raptes

ABSTRACT: A magnetically actuated valve for constricting the flow of fluid through a fluid conduit wherein the valve is provided with tube means which extend laterally from the fluid conduit and contain fluid flow constricting elements which are magnetically driven into fluid flow constricting position within the fluid conduit to achieve an infinite variation between minimum and maximum flow conditions.

INVENTOR.
FORNEY FULLER, JR.
BY M. Ted Rapter
ATTORNEY

FIG. 4
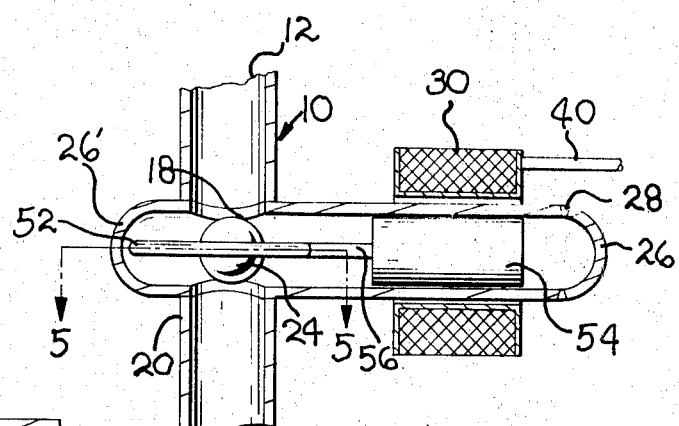
FIG. 5
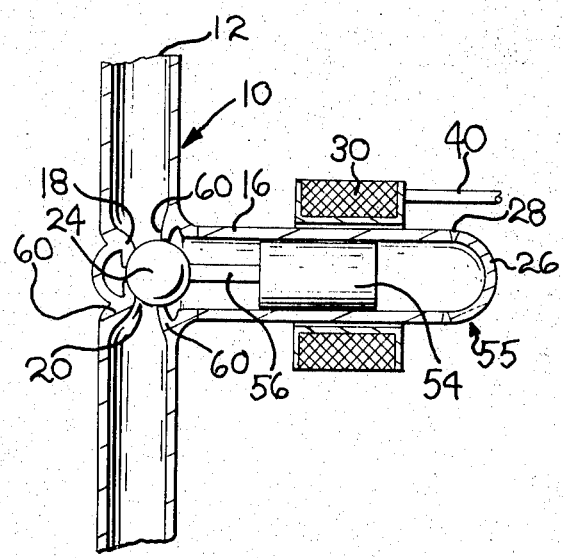
FIG. 6
INVENTOR.
FORNEY FULLER, JR.
BY
ATTORNEY

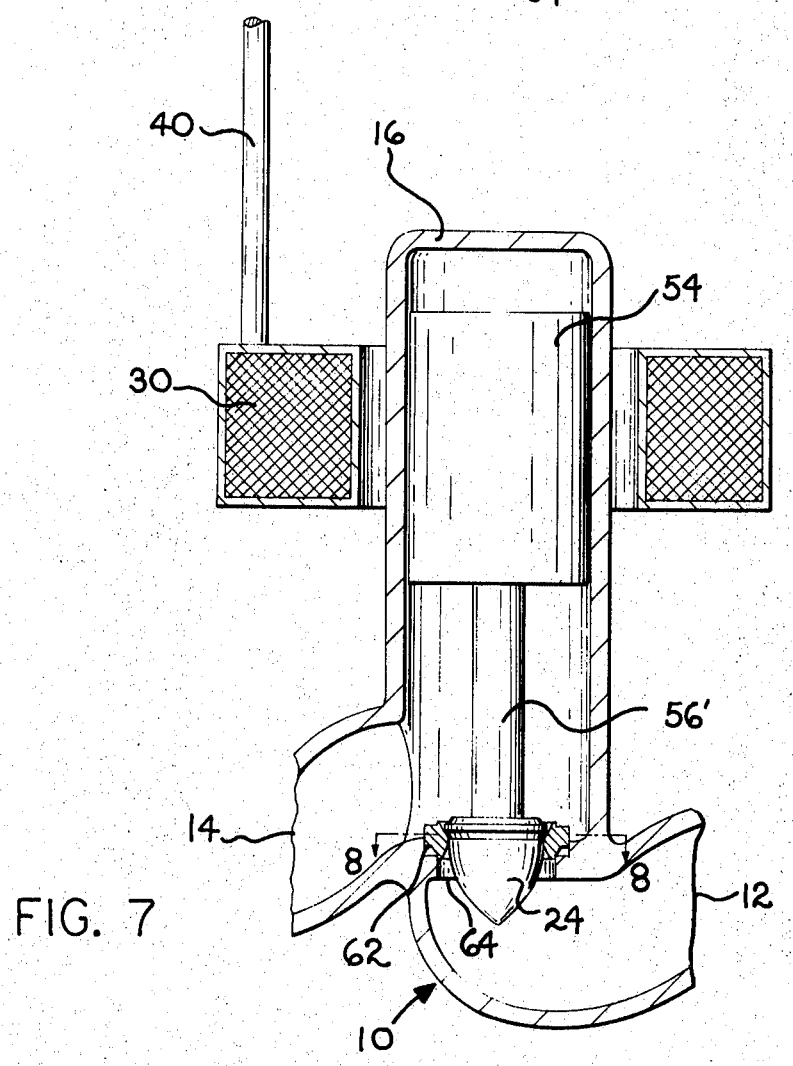

3,556,156

MAGNETICALLY ACTUATED VALVE

BACKGROUND OF THE INVENTION

1. Field of the Invention

In many systems where high pressure fluids are employed, such as boilers, high-pressure steam super heaters, steam reheaters, atomic reactors, and the like, there is a need for means for regulating fluid flow therethrough. In such high pressure systems which contain poisonous, radioactive, or otherwise dangerous fluid materials wherein means are required to regulate the fluid therethrough, many conventional valving techniques are not adaptable due to the potential leakage of the dangerous materials.

2. Description of the Prior Art

Attempts have been made in regulating the flow of fluids in high pressure systems by means of valving systems employing gland packing arrangements. In such arrangements it has been found that leakage of the high pressure fluid occurs due to excessive pressure or slight wear or deterioration of the associated packing.

SUMMARY

It is an object of the present invention to provide a system wherein the flow of material under high pressure or dangerous material can be regulated in a sealed condition.

Another object of the invention is to provide a high pressure system for handling the flow of fluid materials wherein the flow of the fluid can be infinitely varied between minimum and maximum conditions.

The objects and advantages of the invention are achieved by a magnetically actuated valve for use in a fluid conduit having an inlet and outlet and which comprises a first tube having one end in fluid communication with the conduit and the opposite end being closed; fluid flow constricting means disposed within the tube and adapted to move axially therein; means within the fluid conduit and in alignment with the one end of the tube to limit the movement of the fluid flow constricting means transverse to the extension of the longitudinal axis of the tube; and magnetic driving means disposed adjacent to the tube for applying a magnetic field to effect movement of the fluid flow constricting means into the fluid conduit between the inlet and outlet therefore along the longitudinal axis of the tube.

BRIEF DESCRIPTION OF THE DRAWINGS

The above-mentioned as well as other objects and advantages of the invention, will become manifest from reading the following detailed description of several embodiments of the invention when considered in the light of the accompanying drawings, in which:

FIG. 4 is a diagrammatic sectional view of a fluid flow control system similar to the system illustrated in FIG. 2 employing a ball and cage arrangement for constricting the fluid flow in an associated fluid conduit;

FIG. 5 is a sectional view of the system illustrated in FIG. 4 taken along line 5–5 thereof;

FIG. 6 is a diagrammatic sectional view of a fluid flow control system similar to that illustrated in FIG. 4 wherein the fluid flow constricting ball is connected directly to a magnetically driven armature;

FIG. 7 is a diagrammatic sectional view of a fluid flow control system employing a magnetically driven plug constricting valve member; and FIG. 8 is a sectional view of the system illustrated in FIG. 7 taken along line 8–8 thereof.

DESCRIPTION OF THE PREFERRED EMBODIMENTS

Figure 1:
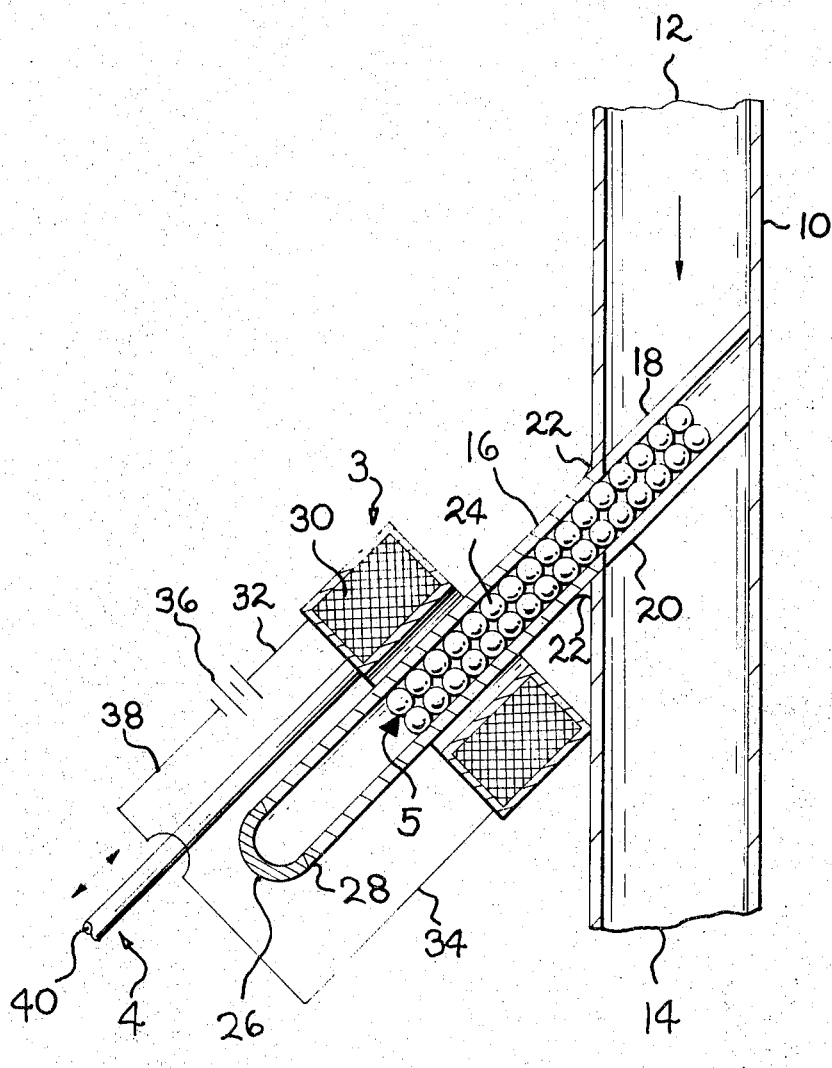
FIG. 1. is a diagrammatic sectional view of a fluid control system and pulling a plurality of magnetically driven fluid flow constricting spheres which are selectively positioned within the main fluid conduit for controlling the rate of flow therethrough.

Referring to the drawings wherein like reference numerals are employed throughout for designating similar elements. In FIG. 1 there is illustrated a fluid flow constricting system wherein a high pressure of dangerous fluid is caused to pass through a main fluid conduit 10 from the inlet end 12 toward the outlet end 14. A magnetically actuated fluid flow constricting valve is adapted to be positioned within the fluid conduit 10 to effectively control the flow of the fluid therethrough. The fluid flow constricting valve includes a tube 16 which is inserted into the fluid conduit 10 through a suitably disposed aperture formed therein. The innermost end of the tube 16, positioned within the interior of the conduit 10, is slotted to form two spaced apart apertures 18 and 20 substantially coextensive with the interior of the conduit 10. The tube 16 and the conduit 10 are sealingly joined as by welding the tube 16 to the conduit 10 where the two elements are juxtaposed as at 22. The tube 16 is preferable formed of a nonmagnetizable materials, such as stainless steel, for example. Disposed within the interior of the tube 16, there is a plurality of spherical elements 24 formed of a magnetically permeable material such as a ferrous alloy, for example. The plurality of elements 24 may be caused to move axially along the longitudinal axis of the tube 16, as will be described in greater detail hereinafter. The outermost end of the tube 16 is sealingly closed by an end cap member 26 which typically welded as at 28 to the material of the main body of the tube 16. The spherical elements 24 are of sufficiently large diameter to prevent their passage through the slots 18 and 20.

A coil 30 is disposed in encircling relation about the tube 16 and has electrical conductors 32 and 34 which lead to a suitable source of electrical energy, such as a storage battery 36 provided to actuate the coil 30. A suitable switch or operating button 38 may be interposed in the energizing circuit for completing or breaking the flow of current therethrough. A rod 40 is affixed to the coil 30 for effecting movement thereof along the outer surface of the tube 16 parallel to the longitudinal axis thereof.

Under normal operating conditions when the switch 38 is open and the coil 30 is deenergized, the spherical elements 24 are caused to be positioned within the interior of the tube 16 adjacent the end cap 26. This positioning is caused by the force of the fluid passing through the conduit 10 from the inlet toward the outlet 14, and also, in the embodiment illustrated in FIG. 1, the forces of gravity will aid in retaining the spherical elements 24 within the outermost end of the tube 16. When the switch 38 is closed, the coil 30 is energized establishing a magnetic field which, in turn, will attract the spherical elements 24. By moving the thus energized coil 30 through the manipulation of the rod 40, the entire plurality of elements 24 may be moved within the interior of the tube 16. In the event the energized coil is moved to the position illustrated in FIG. 1, the innermost group of spherical elements 24 is positioned in the region of the slots 18 and 20 act to constrict the flow of fluid through the conduit 10. Movement of the spherical elements 24 out of fluid flow constricting position may be achieved by either physically displacing the energized coil 30 by appropriate movement to the rod 40 the the outermost end of the tube 16; or alternatively, by deenergizing the coil 30 and allowing the force of the transient fluid within the conduit 10 to cause the spherical elements 24 to be displaced to the outermost end of the tube 16. Also, in the embodiment illustrated in FIG. 1, the force of gravity will aid in effecting a return of the spherical elements 24 to the outermost end of the tube 16.

It will be appreciated that the above described system can effectively control the flow of fluid material under high pressure in a completely enclosed system. No leakage of the high pressure fluid can occur as might be the case with a gland packing of a valve stem of a conventional throttling type valve. It will be appreciated that an infinite variation can be achieved between a minimum flow, with the spherical elements 24 located to completely fill the zone between the slots 18 and 20 of the tube 16, and maximum flow with the spherical elements 24 in a retracted position completely within the outermost portion of the tube 16.

In the event it is found necessary to perform maintenance on the valve structure, such can be achieved by merely cutting off the end cap portion 26 of the tube 16, removing the spherical elements 24 for cleaning, and then reinserting the spherical elements 24 and rewelding the end cap 26.

While mention has been made of the use of an electrically energized coil to establish a magnetic field, it will be understood that satisfactory results can be achieved with a permanent type magnet.

Figure 2:
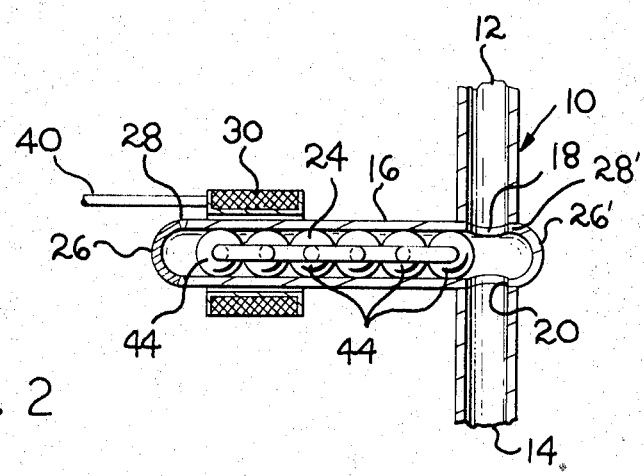
FIG. 2 is a diagrammatic sectional view of the fluid flow control system similar to that illustrated in FIG. 1 wherein the fluid flow constricting elements are interconnected for precise positioning thereof with an associated fluid conduit.

In FIG. 2 there is illustrated a modified form of the device illustrated in FIG. 1 although both structures are designed to achieved the same objectives. The system illustrated in FIG. 2 is comprised of substantially the same elements as the system in FIG. 1, except the spherical elements 24 are articulated by means of a series of linkages 44 which have their ends pivotally attached to adjacent ones of the spherical elements 24. The tube 16 is provided with a second end cap 26 which extends on the opposite side of the fluid conduit 10 to receive the innermost spherical member 24 when the magnetic field producing coil 30 has caused the plurality of spherical elements to move inwardly into a fluid flow constricting position. By interconnecting the spherical elements 24 into an articulated chain, it is possible to obtain a more precise positioning thereof with respect to the orifice formed by the slots 18 and 20 formed in the inner end of the tube 16.

Figure 3:
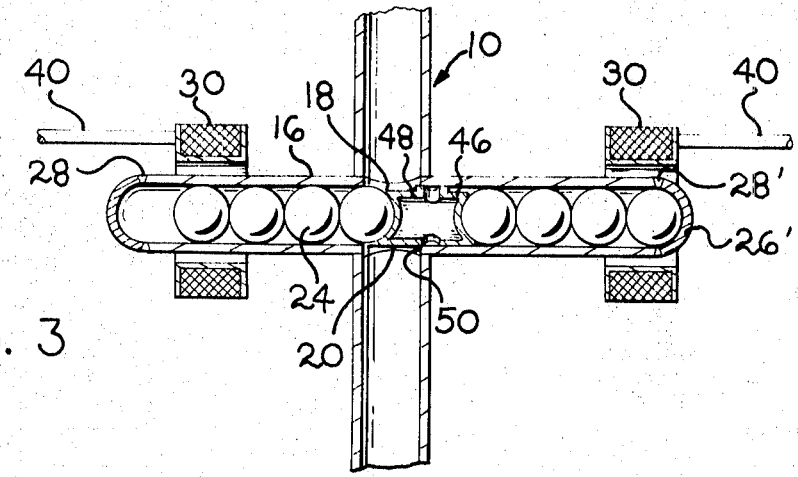
FIG. 3 is a diagrammatic sectional view of a double ended magnetically driven fluid flow control system employing an orifice block structure.

FIG. 3 illustrates a double ended system wherein the tube 16 is caused to pass completely through this fluid conduit 10 and the opposite ends are provided with end caps 26 and 26' and affixed to the tube 16 by welds 28 and 28', respectively. The spherical elements 24 are divided into two groups by centrally disposed orifice block 46 which is adapted to slide within the tube 16 and is in fluid sealing relation with the interior wall surface thereof. The orifice block 46 may typically be hollow and provided with a pair of aligned passageways 48 and 50 which, in turn, are positioned to selectively register with the slots 18 and 20, respectively, formed in the tube 16. In this embodiment, the orifice block 46 cooperates with the spherical element 24 to effectively constrict the fluid flow through the system. In the position illustrated In FIG. 3, the orifice block 46 has been forced to the right by the spherical elements 24 which have been moved by the movement of the energized coil 30. The orifice block 46 is illustrated in a position of nearly maximum constriction to the flow of fluid between the inlet 12 and the outlet 14. In order to move the orifice block 46 and the associated spherical elements 24, the coil 30 is deenergized and coil 30' is energized and then moved the desired degree. It will be appreciated that the double ended magnetic system illustrated in FIG. 3 will typically not be affected by gravity and will give considerably precise positioning of the orifice block 46 with respect to the slots 18 and 20 of the tube 16 to properly control the fluid flow through the conduit 10.

FIGS. 4 and 5 illustrate the magnetically actuated throttling valve system of substantially the same structure as the system illustrated in FIG. 2. However, the system utilizes the single spherical element 24 secured within a cage member 52 adapted to slide within the interior of the tube 16. The cage member 52 is connected through a magnetically permeable armature 54 by a connecting rod 56. The cage member 52 contains the spherical element 24 within cradling fingers 58. When the coil 30 is energized and moved to the position illustrated in FIG. 4, the armature 54 has forced the cage 52 and the associated spherical element to a maximum throttling position wherein the spherical element 24 is positioned in alignment with the slots 18 and 20 formed in the portion of the tube 16 within the fluid conduit 10. With the system illustrated in FIGS. 4 and 5, the cage 52 straddles the fluid stream flowing from the inlet 12 and the outlet 14 through the fluid conduit 10 and provides thereby a smooth passageway permitting straight-through nonturbulent flow of the transient fluid. It will be appreciated that the innermost end of the cage 52, which is remote from the end affixed to the connecting rod 56 will abut against the innersurface of end cap 26'. When the spherical element 24 is in a position relative to the slots 18 and 20 to establish a a condition of maximum constriction to the flow of the transient fluid in the system. The abutment of the innermost end of the cage 52 and the innersurface of the end cap 26' establishes a limit to the inward movement of the fluid flow constricting spherical element 24.

FIG. 6 illustrates a magnetically actuating throttling valve system similar to the system illustrated in FIG. 4 and 5, wherein the slots 18 and 20 are formed by inwardly extending fingers 60 which provides a limit to the inward movement of the spherical fluid flow constricting element 24 which is affixed to an armature 54' by a connecting rod 56'. The spherical element 24 is driven magnetically into and out of fluid flow constricting position by the coaction between the armature 54 and the associated energizing coil 30 as described herein above.

FIGS. 7 and 8 illustrate a magnetically driven fluid flow constricting system similar to the system illustrated in FIG. 6; however, the spherical element 24 of FIG. 6 has been modified to a plug-shape as indicated at 24'. Inward movement of the plug-shaped element 24' is limited by an annular insert 62 having radially inwardly projecting fingers 64. When the element 24' is caused to move inwardly by the cooperation between the energized coil 30 and the associated armature 54', the fluid flow through the conduit 10 between the inlet 12 and the outlet 14 is gradually constricted until the element 24' comes to rest against the fingers 64 of the insert 62 whereupon the constriction of the fluid flow is at a maximum. Upon deenergization of the coil 30, the force of the transient fluid through the system will cause the element 24' to be retracted to a minimum fluid flow constricting position.

In accordance with the provisions of the patent statues I have explained the principal and mode of operation of my invention and have illustrated and described what I now consider to represent its best embodiment.

I claim:

1. A magnetically actuated valve for use in fluid conduit having an inlet and an outlet, said valve in combination with said fluid conduit and comprising:

a first tube having slot means in one end in fluid communication with said conduit and the opposite end being closed; fluid flow constricting means including a plurality of spherical elements disposed within said tube and adapted to move axially therein;

means within said fluid conduit and in alignment with the one end of said tube to limit the axial movement of said fluid flow constricting means disposed transverse to the extension of the longitudinal axis of said tube; and magnetic driving means disposed adjacent to said tube for applying a magnetic field to effect controlled movement of said fluid flow constricting means through said tube along the longitudinal axis thereof, and thereby provide for controlled variations between maximum and minimum fluid flow through said conduit.

2. The invention defined in claim 1 wherein said magnetic means is an electromagnet.

3. The invention defined in claim 1 wherein said magnetic means is a permanent magnet.

4. The invention defined in claim 1 wherein said tube is comprised of nonmagnetizable material.

5. The invention defined in claim 4 wherein said magnetic means is moveable along the longitudinal axis of said tube.

6. The invention defined in claim 1 wherein said fluid flow constricting means is magnetically permeable.